United States Patent [19]
Rekesius

[11] 3,835,760
[45] Sept. 17, 1974

[54] APPARATUS FOR TOASTING BREAD-LIKE ARTICLES
[75] Inventor: John F. Rekesius, Point Pleasant, N.J.
[73] Assignee: Savory Equipment, Inc., Neptune, N.J.
[22] Filed: Apr. 9, 1973
[21] Appl. No.: 348,922

[52] U.S. Cl............... 99/331, 99/386, 99/391, 99/393, 99/401, 99/427, 99/443 C, 126/41 C
[51] Int. Cl. ............................................ A47j 37/08
[58] Field of Search ............ 99/331, 380, 389, 391, 99/393, 401, 443 C, 447, 427; 126/41 C

[56] References Cited
UNITED STATES PATENTS
644,747  3/1900  Shumaker ..................... 126/41 C
3,400,651  9/1968  Hatch ............................. 99/386 X Primary Examiner—Billy J. Wilhite
Attorney, Agent, or Firm—Meyer, Tilberry & Body

[57] ABSTRACT

Apparatus for toasting bread-like articles is disclosed comprising a housing providing a toasting chamber in which electrical heating elements are disposed together with an endless conveyor operable to receive and carry articles to be toasted past the heating elements. The housing has an entrance opening for introducing articles onto the conveyor and when the articles have been toasted they are discharged from the conveyor for removal from the apparatus. The housing is provided with a discharge opening in the top wall thereof and adjacent the rear wall of the housing, and a flue arrangement is provided within the housing to induce hot air in the housing to flow through the discharge opening. Flow of hot air through the flue induces ambient air to flow into the toasting chamber through the product entrance, beneath the conveyor and heating elements and thence upwardly toward the top of the chamber. A temperature sensing element is disposed in the housing in the path of ambient air flow and is responsive to the temperature sensed to cause energization and de-energization of the heating elements.

18 Claims, 5 Drawing Figures

APPARATUS FOR TOASTING BREAD-LIKE ARTICLES

This invention relates to the art of cooking and, more particularly, to apparatus for toasting bread-like articles.

The present invention will be described in detail in conjunction with electric toasting apparatus of the character employing electric resistance type heating elements for toasting food articles. It will be appreciated, however, that the principals of the invention are applicable to toasting devices employing heating devices other than electric resistance elements.

Toasting devices have been provided heretofore which are comprised of a housing defining a toasting chamber and in which an article conveyor is disposed together with heating elements disposed in a toasting zone in the toasting chamber. The heating elements are operable to toast bread-like articles moved therepast by the conveyor. The conveyor generally is motor driven and is operable to receive and continuously move bread-like articles past the heating elements. As the articles pass the heating elements they are toasted, and the articles are then displaced from the conveyor for removal from the housing.

With toasting devices of the foregoing character, considerable difficulty has been encountered in attempting to maintain desired temperature conditions within the toasting chamber and in attempting to control the heating elements in a manner which provides a uniform extent of toasting of succeeding articles conveyed through the toasting chamber. In this respect, hot air in the toasting chamber rises to the upper portion of the housing and produces a high temperature air head which gradually expands downwardly from the top wall of the housing toward the toasting zone. While such a hot air head can be useful to preheat food articles and remove surface moisture therefrom prior to entrance of the articles into the toasting zone, the temperature and the extent of the hot air head toward the toasting zone often exceeds desired limits. Accordingly, articles to be toasted are often preheated to such an extent that the articles are over toasted in passing through the toasting zone. Moreover, the high temperature air head results in a considerable temperature variation between the head area and lower portions of the toasting chamber, and such temperature variation adversely affects the ability to accurately control energization and de-energization of the heating elements to achieve the desired degree of toasting.

The heating elements are thermostatically controlled and a sensing device is disposed in the toasting chamber and is temperature responsive to cause energization and de-energization of the heating elements in an effort to maintain the desired temperature condition in the toasting zone. The sensing device generally is located in the toasting chamber adjacent the heating element or elements so as to be responsive primarily to the heat output therefrom. Accordingly, the sensing device is not capable of anticipating the present or absence of articles on the conveyor and controlling the energization of the heating elements in response thereto. Such anticipation is desirable in order to provide for the heating elements, if de-energized, to be energized when a product is introduced onto the conveyor so that the temperature in the toasting zone is at a desired level when the product reaches the toasting zone, and to provide for the heating element to be de-energized when the conveyor is not carrying products, thus to avoid unnecessary energization of the heating element and the resulting cost of such energization.

In accordance with the present invention, apparatus for toasting bread-like articles is provided which advantageously overcomes the disadvantages encountered with previous toasting apparatus. More partcularly the apparatus of the present invention provides for exhausting hot air from the upper region of the toasting chamber and inducing ambient air flow into the lower portion of the chamber such that more uniform temperature conditions throughout the toasting chamber are achieved. Moreover, the temperature sensing device for controlling the heaters in the toasting zone is disposed in the path of ambient air flow into the toasting chamber to increase the accuracy of control of the heaters.

More particularly, hot air is exhausted from the toasting chamber by a flue arrangement which provides a chimney effect for positively drawing ambient air at room temperature into the toasting chamber. The flow inducing arrangement preferably includes a baffle member adjacent the entrance to the toasting chamber which is cooperable with food products placed on the conveyor to increase the amount of ambient air flow into the lower extremities of the toasting chamber. Thus, the temperature sensing device anticipates the presence of an article of food on the conveyor and, if necessary, causes energization of the heating element or elements in advance of entry of the food product into the toasting zone. The maintenance of a more uniform temperature condition within the toasting chamber enables food products to be conveyed through the apparatus at a faster rate than heretofore possible, thus to increase the product output capacity of the apparatus. Moreover, the hot air and ambient air flow relative to the toasting chamber enables reduction or elimination of high heat peaks by adequate removal of hot air from the upper portion of the toasting chamber and by anticipating heat requirements in response to the presence or absence of an article on the conveyor. Further the hot air and ambient air flow permits products to be processed with a minimum of energy consumption per product, thus minimizing fuel or energy cost per product. Still further, the hot air and ambient air flow, by providing for a finer degree of control of the temperature in the toasting chamber, advantageously enables the apparatus to be more compact than heretofore possible in that the food products are conveyed at a faster rate past the heaters allowing the heaters to be disposed more closely to the path of movement of the food products therepast.

Accordingly, it is an outstanding object of the present invention to provide apparatus for toasting bread-like articles which is more efficient in operation and more economical in cost and operation than toasting apparatus heretofore provided.

Another object is the provision of toasting apparatus which, for a given size, has a higher product output capacity than heretofore possible.

Yet another object is the provision of toasting apparatus in which the control of the heater or heaters in the toasting zone is extremely accurate, and maintenance of a more uniform temperature in the toasting chamber is achieved. A further object is the provision of apparatus of the above character by which food products are processed with a minimum consumption of energy per product.

Still a further object of the present invention is the provision of toasting apparatus of the foregoing character which provides for induced flow of ambient air into the toasting chamber in response to the exhaust of hot air from the toasting chamber to enable maintenance of a more uniform temperature throughout the toasting chamber.

Still another object is the provision of toasting apparatus of the foregoing character in which a temperature sensing device for controlling energization and de-energization of the heater or heaters is disposed in the path of ambient air flow into the toasting chamber to provide for more accurate control of the heater or heaters.

Still a further object is the provision of toasting apparatus of the foregoing character in which the ambient air flow into the toasting chamber controls the temperature sensing device to anticipate heat requirements and control energization and de-energization of the heater in response to such anticipation.

The foregoing objects and others will in part be obvious and in part more fully pointed out hereinafter in conjunction with the description fo a preferred embodiment of the invention illustrated in the accompanying drawings in which.

Figure 1:
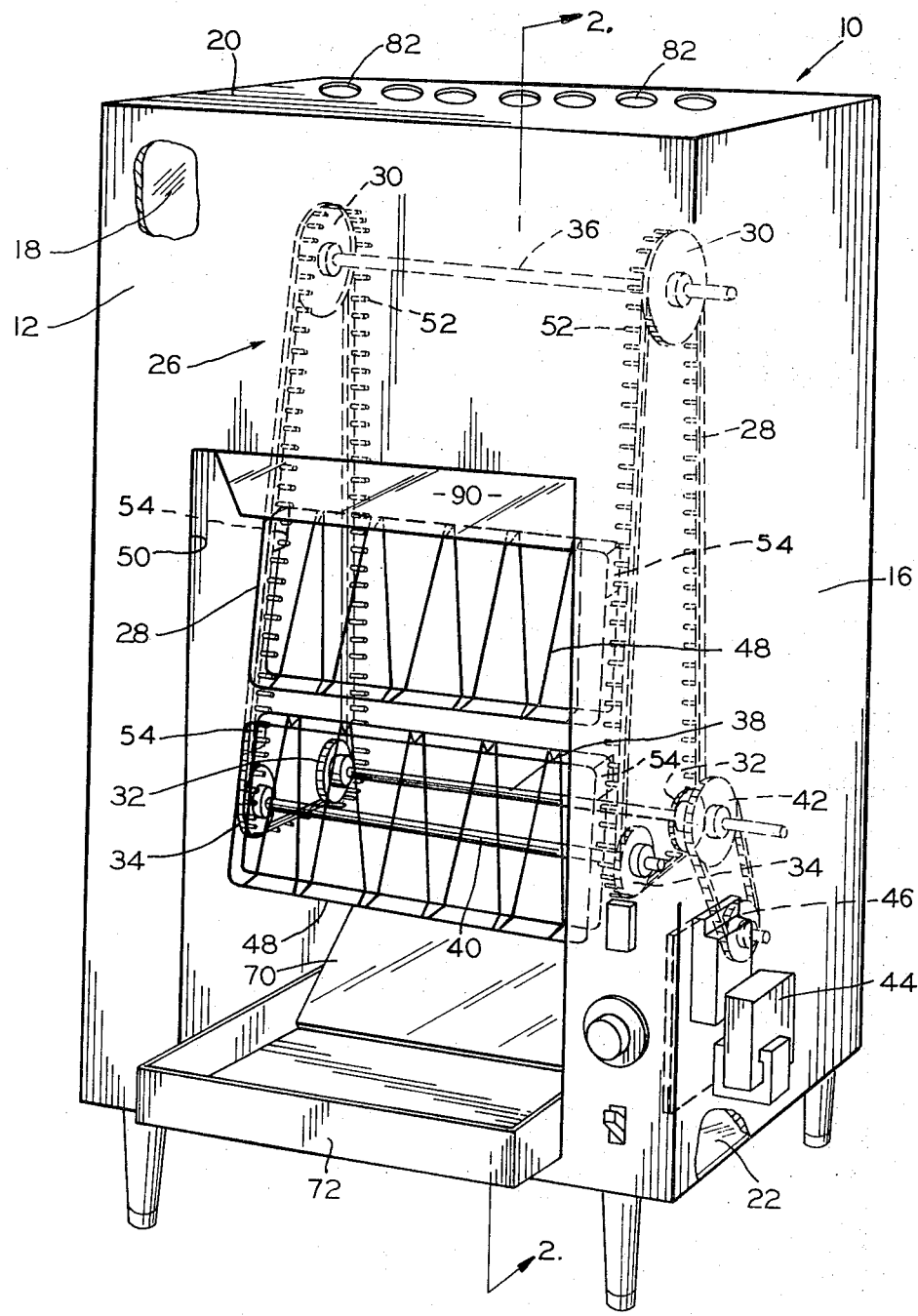
FIG. 1 is a perspective view of toasting apparatus made in accordance with the present invention.
Figure 2:
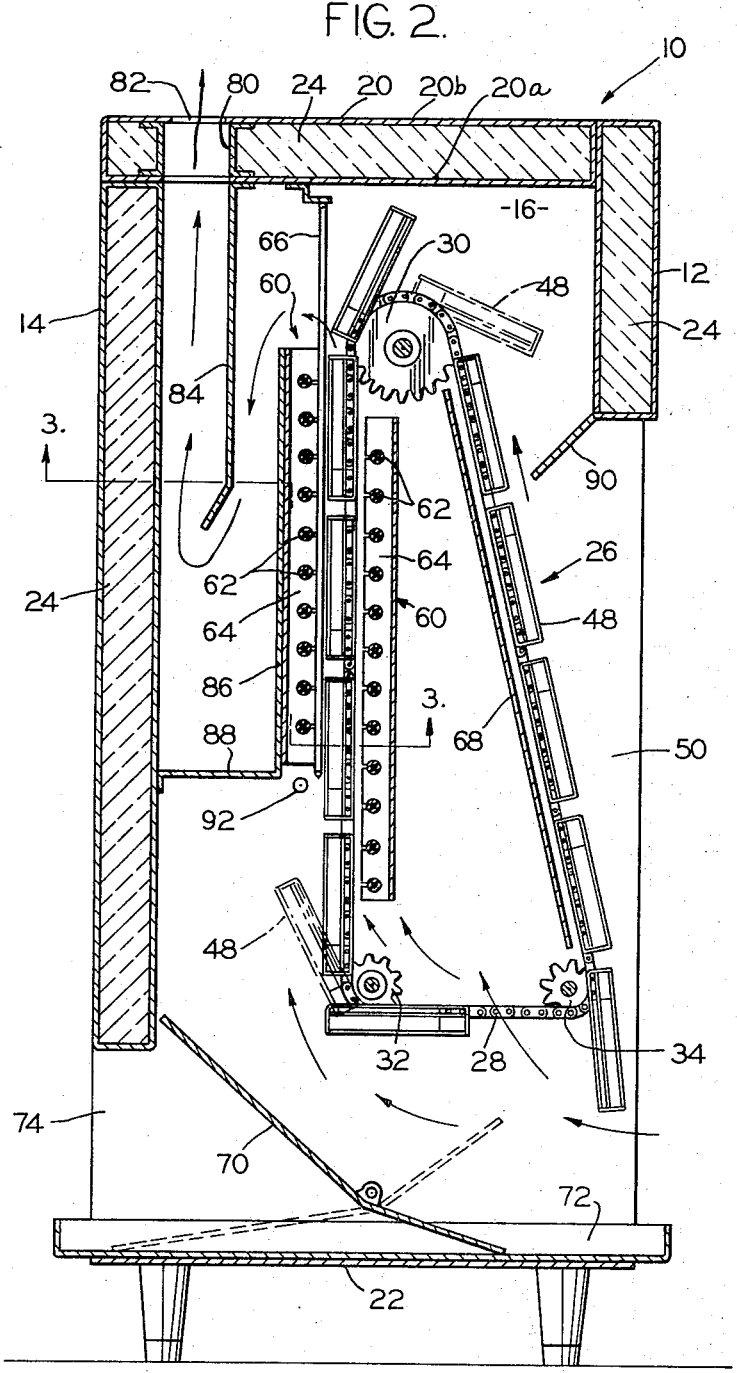
FIG. 2 is a sectional elevation of the apparatus illustrated in FIG. 1, the section being along line 2—2 in FIG. 1.
Figure 3:
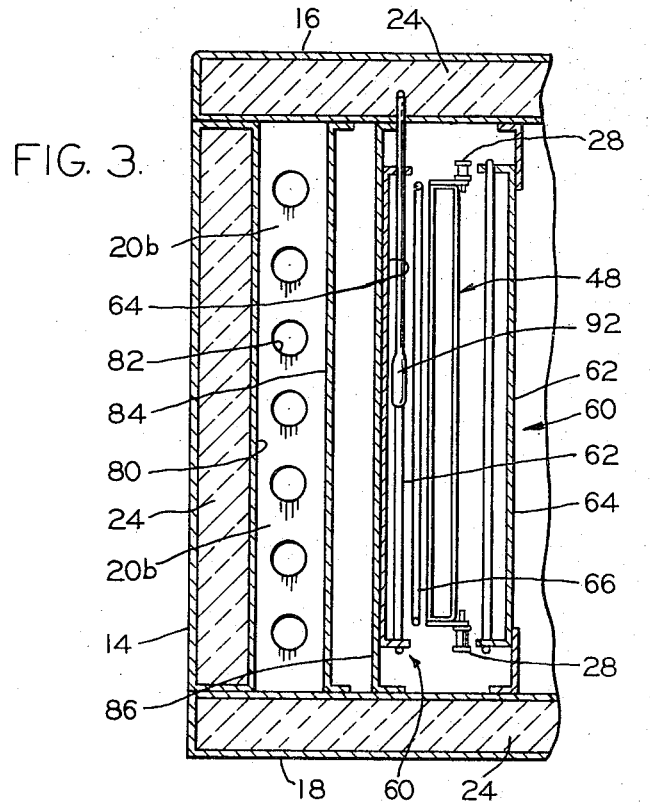
FIG. 3 is a secitonal view of the apparatus illustrated in FIGS. 1 and 2, the section being along line 3—3 in FIG. 2.

Referring now in greater detail to the drawings wherein the showings are for the purpose of illustrating a preferred embodiment of the invention only and not for the purpose of limiting the same, toasting apparatus is illustrated in FIGS. 1–3 which is comprised of a housing 10 having a front wall 12, a rear wall 14, opposed side walls 16 and 18, a top wall 20 and a bottom wall 22. All of the walls, except bottom wall 22, preferably are in the form of hollow sheet metal panels filled with suitable insulating material 24. The several walls of the housing are suitably interconnected with one another, and the interior surfaces thereof together define a toasting chamber.

A conveyor assembly 26 is disposed in the toasting chamber and is defined by a pair of endless sprocket chains 28 trained about corresponding upper sprocket wheels 30 and lower sprocket wheels 32 and 34. Sprocket wheels 30 are mounted on a common shaft 36, sprocket wheels 32 are mounted on a common shaft 38 and sprocket wheels 34 are mounted on a common shaft 40. Shafts 36, 38 and 40 are suitably supported within the housing for rotation relative thereto, and shaft 38 is provided with a drive sprocket 42 which is adapted to be driven by an electric motor 44 mounted within the space between the interior and exterior plates of side wall 16. Sprocket 42 is driven by motor 44 through a drive chain 46. Sprocket chains 28 support a plurality of product carriers in the form of wire baskets 48 into which products to be toasted are placed for movement through the toasting apparatus. To facilitate product introduction onto the carriers, front wall 12 of the housing is provided with an entrance opening 50. In the embodiment illustrated, chains 28 of the conveyor assembly define a triangular conveyor flight having a first portion disposed adjacent entrance 50 and inclined inwardly of the toasting chamber, and a second portion extending generally vertically within the toasting chamber and through a toasting zone as described more fully hereinafter.

Figure 4:
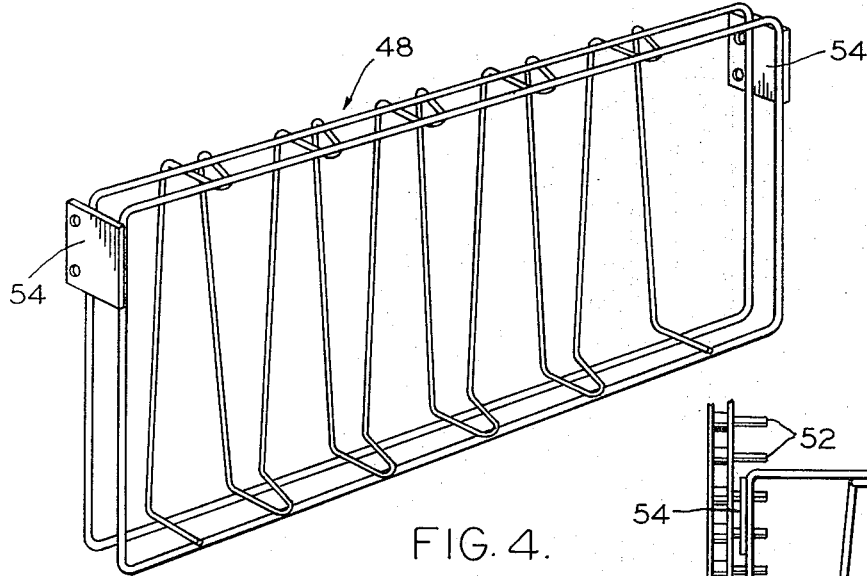
FIG. 4 is a perspective view of a food product carrier component fo the conveyor; and, FIG. 5 is a detail view showing the mounting of one end of the product carrier on one of the conveyor chains.
Figure 5:
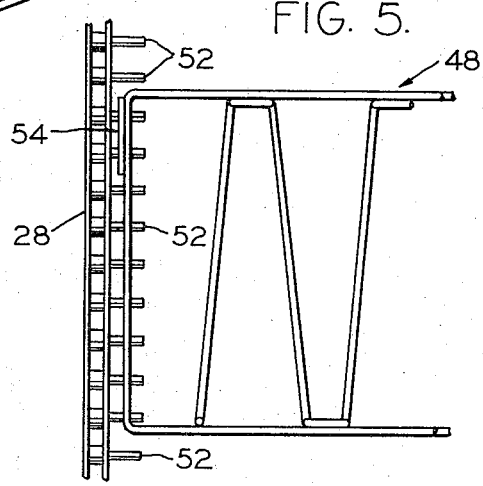

Any suitable conveyor structure may be employed and in the embodiment illustrated, product carriers 48 are in the form of wire baskets extending laterally between conveyor chains 28. Each conveyor chain is provided with a plurality of pins 52 which are disposed on the chains in opposed relationship. As illustrated in greater detail in FIGS. 4 and 5 of the drawing, the opposite sides of wire baskets 48 are provided with mounting plates 54 having pairs of apertures therein adapted to receive an adjacent pair of pins 52 on the corresponding conveyor chain 28. This arrangement provides for the product baskets to lie parallel to the plane of the chains along the straight portions thereof and to swing out from the chains as illustrated in FIG. 2 of the drawing when the chains move around the sprocket wheels.

The toasting apparatus further includes a pair of heating units 60 disposed on opposite sides of the vertical flight portion of the conveyor as illustrated in FIG. 2. Each heater unit 60 is comprised of electrically energizable resistance type heating elements 62 supported in spaced apart relationship by corresponding support brackets 64 which in turn are suitably interconnected with the housing to support the heating elements relative to the portion of the conveyor flight extending therebetween. It will be appreciated that the heating elements extend laterally of the toasting chamber to an extent corresponding generally to the width of the conveyor device and are of a vertical extent designed to provide for food products passing therebetween to be toasted to the desired extent. It will be appreciated too that the heating elements are adapted to be interconnected with a source of power for energization thereof, not illustrated, and that the energization and de-energization of the heating chamber is thermostatically controlled as set forth more fully hereinafter.

The area between heating units 60 in the direction from entrance 50 toward rear wall 14 and the area between the upper and lower extremities of the heating units define a toasting zone within the toasting chamber. A wire grid or screen 66 extends through the toasting zone adjacent the rearward most heating unit 60 and is suitably supported in the housing. Grid 66 serves to retain food products in the product carriers as the latter move downwardly through the toasting zone. It will be appreciated, therefore, that the wire screen or grid is of a width in the direction between side walls 16 and 18 sufficient to provide for the articles in the baskets to be engaged thereby and retained in the basket as the latter move through the toasting zone. The apparatus further includes a plate 68 of metal and/or insulating material disposed behind the inclined flight portion of the conveyor chains. Plate 68 provides a heat shield adjacent entrance 50 to prevent the egress of hot air from the toasting chamber through entrance 50 and to provide for the induction of ambient air at room temperature into the toasting chamber in the manner and for the purpose set forth more fully hereinafter.

In operation of the device as thus far described, articles to be toasted are placed by an operator on the food product carriers through entrance 50. The conveyor is operated to move the articles upwardly within the toasting chamber and then downwardly through the toasting zone. When an article carrier passes the lowermost end of the wire screen 66 the toasted article therein is free to fall from the carrier toward bottom wall 22 of the housing. If the article does not fall at this time, the article will fall from the carrier when the latter moves around sprocket wheel 32. Preferably, a deflector plate 70 is provided beneath the conveyor for delivering the toasted products forwardly towards entrance 50. Further, a tray 72 is supported for sliding movement along bottom wall 22, and the toasted articles are deflected into the tray by plate 70. Plate 70 preferably is adjustably interconnected with the housing side walls to provide for the plate to be selectively positioned either in the solid line position illustrated in FIG. 2 or in the broken line position illustrated in which the plate is positioned to deflect articles toward rear wall 14 of the housing. This enables food products to be delivered selectively to the front or rear of the apparatus, and to facilitate rear delivery rear wall 14 is provided with a suitable opening 74. Tray 72 is slidable outwardly with respect to the front wall 12 and with respect to rear wall 14 to provide for the deflected articles to be more readily available to the operator for removal from the apparatus.

In accordance with the present invention, ambient air at room temperature is caused to flow into the toasting chamber through entrance 50 along a path including a portion leading beneath heat shield 68 and the conveyor device to the lower extremity of the toasting zone. The induced ambient air flow and the manner in which it is achieved advantageously provides for maintaining a more uniform temperature throughout the toasting chamber. In the embodiment illustrated, the ambient air inflow through entrance 50 is induced by a flue arrangement within the housing through which hot air in the upper region of the toasting chamber is exhausted to atmosphere. More particularly, with reference to FIGS. 1-3, top wall 20 of the housing is provided with an opening leading from the toasting chamber to atmosphere. The size of the opening will depend on the air flow characteristics desired, and the opening may be provided in any suitable manner. In the embodiment illustrated, inner plate 20a of top wall 20 is cut away together with the insulating material within the wall panel to define a rectangular opening 80 of a width corresponding substantially to the distance between the inner surfaces of side walls 16 and 18. Further, outer plate member 20b of top wall 20 is provided with a plurality of apertures 82 along the length of opening 80. Apertures 82 are of a number and size designed to achieve the desired air flow. It will be appreciated, however, that the exhaust opening can be defined by the single opening through top wall 20, and that the control provided by apertures 82 could be achieved by a separate plate component suitably mounted on the top wall with respect to the opening therethrough. Still further, it will be appreciated that a plurality of individual circular openings could be provided through top wall 20 rather than the combination of a single rectangular opening and an apertured plate.

The flue arrangement further includes a baffle plate 84 of sheet metal suitably interconnected with and extending downwardly from inner plate 20a of top wall 20. Baffle plate 84 extends between side walls 16 and 18 and may be suitably interconnected therewith as well as with wall 20 such as by spot welding or by the use of mechanical fasteners such as screws. The flue arrangement further includes a second baffle plate 86 spaced forwardly in the toasting chamber from baffle plate 84 and extending downwardly in the chamber behind the rearward heating unit 60. The upper end of baffle plate 86 and the lower end of baffle plate 84 overlap one another for the purpose set forth hereinafter. The bottom end of baffle plate 86 is closed with respect to rear wall 14 and in this respect includes a bottom wall portion 88 extending toward and suitably interconnected with the inner panel of rear wall 14. Baffle plate 86 extends between side walls 16 and 18 of the housing and can be suitably interconnected therewith such as by spot welding or fastener elements.

It will be appreciated that the width of exhaust opening 80 and the width of baffle plates 84 and 86 may be other than the full width between side walls 16 and 18, it only being necessary that the plates be structurally interrelated with one another and with the exhaust opening to define a flow path having an entrance end disposed in the toasting chamber in the upper region thereof and an exit end in communication with the discharge opening through the top wall. Moreover, it will be appreciated that the discharge opening while illustrated as being in top wall 20 could be through rear wall 14 or one of the side walls 16 and 18 of the housing. Many arrangements to provide a flue for inducing ambient air flow into and through the housing in accordance with the principals of the present invention will be readily apparent from the present description.

The overlapped relationship between the lower end of baffle plate 84 and the upper end of baffle plate 86 advantageously provides for hot air in the upper portion of the toasting chamber to follow a sinuous path leading downwardly between plates 84 and 86 and thence upwardly between plate 84 and rear wall 14 and through the discharge opening to atmosphere. By providing for the overlap between plates 84 and 86 to be spaced below top wall 20 and thus the discharge opening, the hot air flowing through the discharge opening at the top of the housing has a chimney effect which causes ambient air at room temperature to be drawn into the toasting chamber through entrance 50. The extent to which ambient air is induced to flow into the toasting chamber through entrance 50 is dependent on the width of the flow path between plates 84 and 86, the width of the flow path between plate 84 and rear wall 14, the number and size of the discharge openings through top wall 20, the vertical dimensions of plates 84 and 86 and the vertical extent of the overlap thereof. It will be appreciated, therefore, that many adjustments can be made to achieve the desired air flow.

The extent to which ambient air at room temperature is drawn into the toasting chamber and into the lower portion thereof beneath the toasting zone is dependent in part on the presence or absence of a food product or products in the carriers adjacent entrance 50 of the apparatus. In this respect, if the carriers adjacent the entrance are filled with food products to be toasted, the food products restrict the area available for ambient air to flow through entrance opening 50 and upwardly into the upper portion of the toasting chamber. More particularly, the air is restricted from flowing transversely through the conveyor device toward plate 68 and thence upwardly into the toasting chamber. Accordingly, the ambient air, through the suction created by the flue arrangement, enters entrance 50 and flow primarily into the lower area of the toasting chamber beneath plate 68 and the conveyor and thence upwardly toward the toasting zone. This flow characteristic is desired and can be enhanced by providing a baffle 90 across the upper edge of entrance opening 50 and extending inwardly of the toasting chamber toward conveyor 26. Baffle 90 together with food products in the product carriers further restricts ambient air flow into the upper portion of the toasting chamber to increase ambient air flow along the desired path extending into the lower area of the toasting chamber and thence upwardly toward the toasting zone.

Restriction of ambient air flow past the upper edge of entrance 50 and upwardly into the upper portion of the toasting chamber is also restricted by the product disposition relative to front wall 12 as the product carriers move around upper sprocket wheels 30. As mentioned hereinabove, the pinned relationship between the sprocket chains 28 and product carriers 48 causes the latter to swing outwardly from the chains as the carrier moves around the sprocket wheels of the conveyor, and this swinging movement causes the lower end of the article carriers to swing outwardly toward front wall 12 as illustrated in FIG. 1 of the drawing. The latter disposition of the article carriers, when the latter are carrying food products, restricts ambient air flow through entrance 50 and upwardly into the toasting chamber.

It will be appreciated that the flue arrangement provides for a continuous discharge of hot air from the toasting chamber and that the discharge of hot air is effective to positively draw ambient air into the toasting chamber through the entrance opening to replace the exhausted air. The constant flow of hot air through the discharge opening and ambient air into the entrance opening provides a continuous circulation and intermingling of air within the toasting chamber so that a more uniform temperature is maintained throughout the toasting chamber. In this respect, the inflow of ambient air and discharge of hot air provide for the temperature of the hot air in the upper portion of a toasting chamber to be maintained at a substantially uniform level, and the constant withdrawal of hot air through the flue arrangement enables maintenance of a substantially constant volume of hot air in the head area to prevent the progressive extension of the air head downwardly within the toasting chamber in the manner heretofore described.

The air circulation provided by the flue arrangement also advantageously enables heating units 60 to be more accurately controlled than heretofore possible and to be controlled in a manner to achieve a more economical consumption of power. In this respect, the temperature sensing thermostat device through which energization and de-energization of the heating units is controlled is positioned in the toasting chamber and in the path of the portion of the ambient air flowing into the lower area of the chamber. With the temperature sensing device so disposed, it is responsive to the sensing of the cooler ambient air to control energization of the heating elements. Since heat rises in the toasting chamber it will be appreciated that the temperature will vary upwardly and downwardly in the lower area at a faster rate than any temperature variation in the upper portion of the toasting chamber into which the hot air continuously rises. With the temperature sensing device disposed in the path of ambient air flow into the lower area of the toasting chamber the temperature sensing device is more quickly responsive to a heating requirement to cause energization of the heating units and is more quickly responsive to the lack of a heating requirement to cause de-energization of the heating units. This provides for the toasting device to process products with a minimum amount of energy per product and accordingly a savings in power consumption.

The temperature sensing device can be positioned in any desired location in the path of ambient air flow into the lower portion of the toasting chamber and, in the embodiment illustrated herein, the temperature sensing thermostat bulb 92 is positioned beneath the rearward most one of the heating units 60. The temperature sensing device is of the character which responds to a sensed temperature at one level to cause energization of the heating units and responds to a higher sensed temperature to cause de-energization of the heating units.

If the toasting device is being continuously operated and food products are being continuously introduced onto the carriers through entrance opening 50, the constant air flow provided by the flue arrangement results in stabilized temperature conditions within the toasting chamber and temperature sensing device 92 is operable under such conditions to cycle the heating units on and off to maintain the stabilized temperature condition. It will be appreciated that the constant flow of ambient air across temperature sensing device 92 enables the latter to be more quickly responsive to temperature variations in the toasting chamber, whereby the energization and de-energization of the heating units can be more accurately controlled to enable more uniform toasting of succeeding products passing through the toasting zone.

If, after operating continuously for a given period of time, the operator stops placing food products on the product carriers, the amount of ambient air flowing through entrance opening 50 into the lower portion of the toasting chamber is reduced. This results from the fact that there are no products on the inclined flight of the conveyor to restrict flow of ambient air through entrance opening 50 and upwardly into the upper portion of the toasting chamber and, accordingly, there are no products to restrict such flow by swinging of the article carriers outwardly toward front wall 12 of the housing. Therefore, more ambient air can flow into the upper portion of the toasting chamber than before and consequently the amount drawn into the lower portion of the toasting chamber is reduced. As a result of the reduced flow of ambient air into the lower portion fo the toasting chamber, temperature sensing device 92 quickly responds to cause de-energization of the heating elements. When the operator again proceeds to introduce food products onto the carriers of the conveyor, flow of ambient air through entrance opening 50 and into the upper portion of the toasting chamber is restricted in the manner described hereinabove and the amount of ambient air at room temperature drawn into the lower portion of the toasting chamber is increased. The increase of ambient air flow into the lower portion of the toasting chamber quickly reduces the temperature of the air at the location of temperature sensing device 92, whereby the latter operates to cause energization of the heating units in anticipation of the impending heat requirement. Such anticipation of the heating requirement and the resultant energization of the heating units provides for the newly deposited articles of food to be toasted to the desired extent. This anticipation capability advantageously enable the heating units to be de-energized for longer periods of time when products are not being continuously introduced onto the conveyor and at the same time provides for the heating units to be energized as a result of the presence of a food product in a basket at the entrance to the device to prevent wastage of food products by under toasting of a number of products first introduced onto the conveyor after a period of non-use.

In the embodiment described hereinabove, the deflector plate 70 is positioned to deflect toasted products toward entrance opening 50 of the housing. In this position, plate 70 engages the inner surface of rear wall 14 of the housing, whereby food product discharge opening 74 is closed. When plate 70 is positioned to deflect toasted products toward discharge opening 74, it will be noted that ambient air will be induced to flow into the toasting chamber through discharge opening 74 as well as entrance opening 50. It will be appreciated that the ambient air flow into the toasting chamber in this case will provide the desired flow of ambient air into the lower portion of the toasting chamber and upwardly toward the toasting zone, whereby the anticipatory capability as well as the desired air flow through the toasting chamber to the flue arrangement will be achieved. Accordingly, it will be appreciated that deflector plate 70 when positioned to deflect toasted products toward entrance opening 50 of the housing could terminate short of rear wall 14 of the housing without affecting the desired air flow and anticipation characteristics.

While a specific structural arrangement has been illustrated and described herein, it will be appreciated that the ambient air flow and heat anticipating concepts of the present invention can be achieved with other structural arrangements of toasting apparatus. Moreover, while electric heating elements have been described as the heating units for achieving toasting, it will be appreciated that other forms of heaters such as gas burners could be employed and that the temperature sensing thermostat device would be operable to control the heat output of such heating units. It will be appreciated too that where electric resistance type heating elements are employed, one of the heating units can be continuously energized and the other intermittently energized, or both heating units may be intermittently energized to maintain the desired heat output in the toasting zone. Many different embodiments of the present invention will be obvious and many changes can be made in the embodiment herein illustrated and described without departing from the principals of the present invention. Accordingly, it is to be distinctly understood that the foregoing descriptive matter is to be interpreted merely as illustrative of the present invention and not as a limitation.

Having thus described my invention, I claim:

1. Apparatus for toasting bread-like products comprising, a housing having wall means defining a toasting chamber, controlled heating means in said chamber, conveyor means in said chamber for receiving and carrying products past said heating means for toasting, said housing including an entrance opening through which products to be toasted can be introduced onto said conveyor means and a discharge opening for heated air in said chamber, said heating means having first and second ends, means in said housing for inducing the flow of hot air in said chamber out through said discharge opening and ambient air into said chamber through said entrance opening and along a path from said entrance opening and across said heating means from said first end toward said second end, and heating means control means including temperature sensing means disposed in said chamber between said entrance opening and said first end of said heating means and in said path of ambient air flowing into said chamber, whereby said heating means is controlled in response to the temperature of ambient air flowing along said path.

2. The apparatus according to claim 1, wherein said means in said housing for inducing flow includes flue means leading to said discharge opening.

3. The apparatus according to claim 1, wherein said wall means of said housing includes a pair of opposed side walls and a top wall, said entrance opening being in one of said side walls, and said discharge opening being in said top wall and adjacent the other of said side walls.

4. The apparatus according to claim 3, wherein said flow inducing means includes flue means leading from said chamber to said discharge opening.

5. The apparatus according to claim 4, wherein said flue means includes baffle plate means defining a sinuous path for flow of hot air from said chamber to said discharge opening.

6. The apparatus according to claim 3 wherein said housing wall means includes bottom wall means, said conveyor means having a flight portion adjacent said entrance opening and extending in the direction between said top wall and bottom wall means, said heating means being disposed between said flight and the other of said side walls, said heating means having a lower extremity spaced above said bottom wall means and defining said first end, said path of ambient air flow including a portion extending inwardly of said chamber from said entrance opening and into the space between said lower extremity and said bottom wall means, and said temperature sensing means being disposed in said space.

7. The apparatus according to claim 6, wherein said entrance opening has an upper edge spaced below said top wall, and plate means extending from said edge toward said flight portion of said conveyor means, said plate means being cooperable with a product on said conveyor means moving past said plate means to restrict ambient air flow into said chamber along said upper edge.

8. Apparatus for toasting bread-like products comprising, a housing having wall means defining a toasting chamber, controlled heating means in said chamber, conveyor means in said chamber for receiving and carrying products past said heating means for toasting, said housing including an entrance opening through which products to be toasted can be introduced onto said conveyor means and a discharge opening for heated air in said chamber, flue means in said housing leading to said discharge opening for inducing the flow of hot air in said chamber out through said discharge opening and ambient air into said chamber through said entrance opening and along a path toward said heating means, and heating means control means including temperature sensing means disposed in said chamber between said entrance opening and flow inducing means and in said path of ambient air flowing into said chamber, whereby said heating means is controlled in response to the temperature of ambient air flowing along said path, said wall means of said housing including a pair of opposed side walls and a top wall, said entrance opening being in one of said side walls, said discharge opening being in said top wall and adjacent the other of said side walls, said flue means including baffle plate means defining a sinuous path for flow of hot air from said chamber to said discharge opening, and said baffle plate means including first plate means spaced inwardly from said other side wall and extending downwardly from said top wall to a first location therebelow, and second plate means spaced inwardly of said first plate means and extending upwardly from a location below said first location to a second location below said top wall and above said first location.

9. Apparatus for toasting bread-like products comprising, a housing having wall means defining a toasting chamber, controlled heating means in said chamber, conveyor means in said chamber for receiving and carrying products past said heating means for toasting, said housing including an entrance opening through which products to be toasted can be introduced onto said conveyor means and a discharge opening for heated air in said chamber, means in said housing for inducing the flow of hot air in said chamber out through said discharge opening and ambient air into said chamber through said entrance opening and along a path toward said heating means, and heating means control means including temperature sensing means disposed in said chamber between said entrance opening and flow inducing means and in said path of ambient air flowing into said chamber, whereby said heating means is controlled in respnse to the temperature of ambient air flowing along said path, said wall means of said housing including bottom wall means, a pair of opposed side walls and a top wall, said entrance opening being in one of said side walls, said discharge opening being in said top wall and adjacent the other of said side walls, said conveyor means having a flight portion adjacent said entrance opening and extending in the direction between said top wall and bottom wall means, said heating means being disposed between said flight and the other of said side walls, said heating means having a lower extremity spaced above said bottom wall means, said path of ambient air flow including a portion extending inwardly of said chamber from said entrance opening and into the space between said lower extremity and said bottom wall means, said temperature sensing means being disposed in said space, said flow inducing means including a first baffle plate in said chamber spaced from said other side wall and extending downwardly from said top wall to a first location and a second baffle plate in said chamber spaced inwardly of said first baffle plate, said second baffle plate having an upper end disposed intermediate said top wall and first location and having a lower end below said first location, and means closing the space between said lower end and said other wall means.

10. The apparatus according to claim 9, wherein said heating means includes electric heating element means extending in the direction between said top wall and bottom wall means, and adjacent said second baffle plate, and said temperature sensing means is disposed below the lower extremity of said heating element means.

11. Apparatus for toasting bread-like products comprising, a housing having a front wall, a rear wall, opposed side walls and top and bottom walls, said walls defining a toasting chamber therebetween, said front wall having an entrance opening leading to said chamber and having an upper edge spaced below said top wall, product conveyor means disposed in said chamber, said conveyor means including an endless conveyor having a first flight portion extending in the direction between said top and bottom walls and adjacent said entrance opening and a second flight portion extending in said direction and spaced from said first flight portion in the direction of said rear wall, said conveyor means having an upper extremity intermediate said top wall and upper edge of said entrance opening and a lower extremity spaced above said bottom wall, electric heating element units disposed in said chamber on opposite sides of said second flight portion in the direction between said front and rear walls, said heating element units having lower extremities spaced above the lower extremity of said conveyor means and upper extremities spaced below said top wall, heat shield means between said heating element units and said first flight portion of said conveyor, said heat shield means having a lower edge adjacent said lower extremity of said conveyor means, said top wall having a discharge opening therethrough adjacent said rear wall, flue means extending into said chamber from said discharge opening, said flue means having an inlet end spaced below said top wall and disposed between said rear wall and the one of said heating element units closest thereto, said flue means and discharge opening being cooperable to induce ambient air flow into said chamber through said entrance opening and along a path through said chamber including a portion extending through the space between the lower extremities of said conveyor means and heating element units, and means including temperature sensing means for controlling energization of said heating element units, said temperature sensing means being disposed in said space between the lower extremities of said conveyor means and heating element units to sense the temperature of ambient air flowing along said portion of said path.

12. The apparatus according to claim 11, wherein said flue means includes a first baffle plate in said chamber spaced from said rear wall and extending downwardly from said top wall to a location below the upper extremity of said one heating element unit.

13. Apparatus for toasting bread-like products comprising, a housing having a front wall, a rear wall, opposed side walls and top and bottom walls, said walls defining a toasting chamber therebetween, said front wall having an entrance opening leading to said chamber and having an upper edge spaced below said top wall, product conveyor means disposed in said chamber, said conveyor means including an endless conveyor having a first flight portion extending in the direction between said top and bottom walls and adjacent said entrance opening and a second flight portion extending in said direction and spaced from said first flight portion in the direction of said rear wall, said conveyor means having an upper extremity intermediate said top wall and upper edge of said bottom wall, electric heating element units disposed in said chamber on opposite sides of said second flight portion in the direction between said front and rear walls, said heating element units having lower extremities spaced above the lower extremity of said conveyor means and upper extremities spaced below said top wall, heat shield means between said heating element units and said first flight portion of said conveyor, said heat shield means having a lower edge adjacent said lower extremity of said conveyor means, said top wall having a discharge opening therethrough adjacent said rear wall, flue means extending into said chamber from said discharge opening, said flue means having an inlet end spaced below said top wall and disposed between said rear wall and the one of said heating element units closest thereto, said flue means and discharge opening being cooperable to induce ambient air flow into said chamber through said entrance opening and along a path through said chamber including a portion extending through the space between the lower extremities of said conveyor means and heating element units, and means including temperature sensing means for controlling energization of said heating element units, said temperature sensing means being disposed in said chamber to sense the temperature of ambient air flowing along said portion of said path, said flue means including a first baffle plate in said chamber spaced from said rear wall and extending downwardly from said top wall to a location below the upper extremity of said one heating element unit, and said flue means further including a second baffle plate between said first baffle plate and said one heating element unit, said second baffle plate having an upper end spaced above said location and a lower end spaced below said location and closed with respect to said rear wall.

14. The apparatus according to claim 13, wehrein said rear wall includes a product discharge opening adjacent said bottom wall, product deflector means in said chamber beneath the lower extremity of said conveyor means and selectively adjustable to deflect toasted products toward one or the other of said entrance and product discharge openings, said product discharge opening providing an entrance to said chamber for ambient air when said deflector means is adjusted to deflect products toward said product discharge opening.

15. The apparatus according to claim 13, and plate means extending inwardly of said chamber from said upper edge of said entrance opening toward said first flight portion of said conveyor means, said plate means being cooperable with a product on said conveyor means moving past said plate means to restrict ambient air flow into said chamber in the direction from said upper edge to the space above the upper extremity of said conveyor means.

16. Apparatus for toasting bread-like products comprising, a housing having wall means defining a toasting chamber including a toasting zone, product conveyor means in said toasting chamber for receiving and carrying products through said toasting zone, heating means in said toasting zone for toasting products moved therethrough, said housing including an entrance opening through which products to be toasted can be introduced onto said conveyor means and a discharge opening for heated air in said chamber, said wall means of said housing including a pair of opposed side walls and a top wall, said entrance opening being in one of said side walls, and said discharge opening being in said top wall and adjacent the other of said side walls, said toasting zone being positioned in said chamber between said entrance and discharge openings, and means in said housing to induce ambient air flow into said chamber through said entrance opening and across said toasting zone toward said discharge opening.

17. Apparatus for toasting bread-like products comprising, a housing having wall means defining a toasting chamber including a toasting zone, product conveyor means in said toasting chamber for receiving and carrying products through said toasting zone, heating means in said toasting zone for toasting product moved therethrough, said housing including an entrance opening through which products to be toasted can be introduced onto said conveyor means and a discharge opening for heated air in said chamber, said toasting zone being positioned in said chamber between said entrance and discharge openings, flue means in said housing and leading to said discharge opening to induce ambient air flow into said chamber through said entrance opening and across said toasting zone toward said discharge opening, said wall means of said housing including a pair of opposed side walls and a top wall, said entrance opening being in one of said side walls, said discharge opening being in said top wall and adjacent the other of said side walls, and said flue means including baffle plate means defining a sinuous path for flow of hot air from said chamber to said discharge opening.

18. The apparatus according to claim 17, wherein said baffle plate means includes first plate means spaced inwardly from said other side wall and extending downwardly from said top wall to a first location therebelow, and second plate means spaced inwardly of said first plate means and extending upwardly from a location below said first location to a second location below said top wall and above said first location.

* * * * *